United States Patent
Favrot et al.

(10) Patent No.: US 8,927,643 B2
(45) Date of Patent: Jan. 6, 2015

(54) BLOCK DIENE ELASTOMER FOR RUBBER COMPOSITIONS THAT CAN BE USED IN PNEUMATIC TIRES

(75) Inventors: Jean-Michel Favrot, Clermont-Ferrand Cedex (FR); Nathalie Simon, Clermont-Ferrand Cedex (FR); Jean Marc Marechal, Clermont-Ferrand Cedex (FR)

(73) Assignees: Compagnie General des Etablissements, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 13/989,188

(22) PCT Filed: Nov. 23, 2011

(86) PCT No.: PCT/EP2011/070744
§ 371 (c)(1),
(2), (4) Date: Jul. 30, 2013

(87) PCT Pub. No.: WO2012/069508
PCT Pub. Date: May 31, 2012

(65) Prior Publication Data
US 2013/0303685 A1      Nov. 14, 2013

(30) Foreign Application Priority Data
Nov. 23, 2010 (FR) ..................................... 10 59643

(51) Int. Cl.
| | |
|---|---|
| C08L 9/00 | (2006.01) |
| C08F 293/00 | (2006.01) |
| C08F 299/00 | (2006.01) |
| B60C 1/00 | (2006.01) |
| C08C 19/26 | (2006.01) |
| C08C 19/42 | (2006.01) |
| C08C 19/44 | (2006.01) |
| C08F 297/02 | (2006.01) |
| C08L 53/00 | (2006.01) |
| C08L 53/02 | (2006.01) |

(52) U.S. Cl.
CPC .................. *C08F 299/00* (2013.01); *B60C 1/00* (2013.01); *C08C 19/26* (2013.01); *C08C 19/42* (2013.01); *C08C 19/44* (2013.01); *C08F 297/02* (2013.01); *C08L 53/005* (2013.01); *C08L 53/02* (2013.01)
USPC .......................................... 524/572; 525/314

(58) Field of Classification Search
USPC ........................................................ 524/572
See application file for complete search history.

(56) References Cited

U.S. PATENT DOCUMENTS

| | | | |
|---|---|---|---|
| 4,550,142 A | 10/1985 | Akita et al. | |
| 4,848,511 A | 7/1989 | Ohyama et al. | |
| 5,066,721 A | 11/1991 | Hamada et al. | |
| 5,916,957 A | 6/1999 | Itoh et al. | |
| 6,013,718 A | 1/2000 | Cabioch et al. | |
| 6,774,255 B1 | 8/2004 | Tardivat et al. | |
| 2002/0179218 A1* | 12/2002 | Pierre et al. ................... | 152/564 |
| 2004/0051210 A1 | 3/2004 | Tardivat et al. | |
| 2004/0132880 A1 | 7/2004 | Durel et al. | |
| 2004/0167705 A1 | 8/2004 | Lingman et al. | |
| 2004/0260002 A1 | 12/2004 | Robert et al. | |
| 2005/0016650 A1 | 1/2005 | Durel et al. | |
| 2005/0016651 A1 | 1/2005 | Durel et al. | |
| 2007/0112120 A1 | 5/2007 | Vasseur | |
| 2008/0132644 A1 | 6/2008 | Lapra et al. | |
| 2009/0186961 A1 | 7/2009 | Araujo Da Silva et al. | |
| 2009/0234066 A1 | 9/2009 | Araujo Da Silva et al. | |
| 2009/0270558 A1 | 10/2009 | Gandon-pain et al. | |
| 2011/0009547 A1 | 1/2011 | Araujo Da Silva et al. | |
| 2011/0152458 A1 | 6/2011 | Araujo Da Silva et al. | |
| 2011/0178233 A1 | 7/2011 | Chaboche et al. | |

FOREIGN PATENT DOCUMENTS

| | | | |
|---|---|---|---|
| EP | 0 709 235 A1 | 5/1996 | |
| EP | 1 278 789 A1 | 1/2003 | |
| FR | 2 526 030 A1 | 11/1983 | |
| FR | 2 740 778 A1 | 5/1997 | |
| FR | 2 930 554 A1 | 10/2009 | |

(Continued)

OTHER PUBLICATIONS

International Search Report (PCT/ISA/210) issued on Feb. 29, 2012, by the European Patent Office as the International Searching Authority for International Application No. PCT/EP2011/070744.

(Continued)

*Primary Examiner* — Hui Chin
(74) *Attorney, Agent, or Firm* — Dickinson Wright PLLC

(57) ABSTRACT

The invention relates to a block diene elastomer corresponding to the following formula:

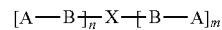

where:
n and m are each an integer of greater than or equal to 0, such that n+m≥1 and n+m≤20,
each A block is composed of a polybutadiene,
each B block is composed of a diene elastomer, the molar content of units resulting from conjugated dienes of which is greater than 15%, the B blocks being identical to one another,
X is an organic or inorganic group which can comprise a functional group which interacts with a reinforcing filler,
the number-average molecular weight Mn1 of each A block varies from 2 500 to 20 000 g/mol,
the number-average molecular weight Mn2 of each B block varies from 80 000 to 350 000 g/mol, and
the content of 1,2- linkages in each A block is between 1 and 20%.

12 Claims, No Drawings

(56) References Cited

FOREIGN PATENT DOCUMENTS

| | | |
|---|---|---|
| WO | WO 97/36724 A2 | 10/1997 |
| WO | WO 99/16600 A1 | 4/1999 |
| WO | WO 01/81439 A1 | 11/2001 |
| WO | WO 02/10269 A2 | 2/2002 |
| WO | WO 02/30939 A1 | 4/2002 |
| WO | WO 02/31041 A1 | 4/2002 |
| WO | WO 02/083782 A1 | 10/2002 |
| WO | WO 03/002648 A1 | 1/2003 |
| WO | WO 03/002649 A1 | 1/2003 |
| WO | WO 03/016837 A1 | 2/2003 |
| WO | WO 03/037946 A2 | 5/2003 |
| WO | WO 2006/069792 A1 | 7/2006 |
| WO | WO 2006/069793 A1 | 7/2006 |
| WO | WO 2006/125532 A1 | 11/2006 |
| WO | WO 2006/125533 A1 | 11/2006 |
| WO | WO 2006/125534 A1 | 11/2006 |
| WO | WO 2009/062733 A2 | 5/2009 |

OTHER PUBLICATIONS

French Search Report for FR 1059643 dated Feb. 8, 2011.

\* cited by examiner

BLOCK DIENE ELASTOMER FOR RUBBER COMPOSITIONS THAT CAN BE USED IN PNEUMATIC TIRES

BACKGROUND

1. Field

The present invention relates to a specific block diene elastomer, the end or ends of which are composed of a polybutadiene block, intended to form an elastomer matrix of a crosslinkable rubber composition of reduced hysteresis, to a rubber composition in which it is present, to a semi-finished article in which it is present and to a tire incorporating such a semi-finished article.

2. Description of Related Art

The reduction in the hysteresis of the mixtures is an ongoing objective of the tire industry in order to limit the consumption of petrol and to thus protect the environment. This reduction in hysteresis must, however, be carried out while keeping intact, indeed even while improving, the processability of the mixtures.

Many solutions have already been experimented with in order to achieve the objective of fall in hysteresis. In particular, the functionalization of the polymers by a functional group which interacts with the reinforcing filler has appeared as an advantageous route.

Functional groups which interact with the filler have thus been attached at the chain end at the start or end of polymerization by means of functional initiators or functionalization agents. By way of example, 4,4'-bis(diethylamino)benzophenone, also known as DEAB, or other aminated functional groups which interact with carbon black have been added at the end of polymerization, as described in the patent documents FR 2 526 030 and U.S. Pat. No. 4,848,511. The polymers coupled by or star-branched by tin comprise functional groups capable of interacting with carbon black which are introduced at the end of polymerization. Mention may be made, by way of example, of the European patent document EP 0 709 235. Functional groups which interact with silica have also been attached at the chain end at the end of polymerization, such as functional groups comprising a silanol group which are disclosed in the patent document FR 2 740 778 or functional groups comprising alkoxysilane or aryloxysilane groups which are described in the document U.S. Pat. No. 5,066,721. The majority of these solutions, both for the black and for the silica, genuinely result in a limitation on hysteresis of the corresponding compositions but concomitantly in a greater difficulty in processing these same compositions.

Functional groups which interact with the filler have also been added in the middle of the chain at the end of polymerization. Mention may be made, by way of example, of patent document FR 2 930 554, which discloses aminoalkoxysilane functional groups located in the middle of the chain. This solution results in improved hysteresis and mechanical properties of the compositions in the vulcanized state and in improved raw processing of these same compositions.

Patent EP 1 278 789 describes a copolymer comprising n blocks (n=2 or 3) intended to form an elastomer matrix of a crosslinkable rubber composition, each of the said blocks comprising an essentially unsaturated diene elastomer and one or each of the said blocks forming a chain end of the said copolymer being composed of a polyisoprene. The number-average molecular weight of the polyisoprene block is between 2 500 and 20 000 g/mol and the number-average molecular weight of the block of the copolymer which is other than the said polyisoprene block is substantially between 80 000 g/mol and 350 000 g/mol. The use of the said block copolymer makes it possible to significantly optimize the results of reduction in hysteresis and processability for the said rubber composition in which it is present.

SUMMARY

The Applicant Company has discovered, surprisingly, that a block diene elastomer corresponding to the following formula:

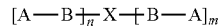

$$[A-B\text{\textemdash}_n X \text{\textemdash} B-A]_m$$

where:
n and m are each an integer of greater than or equal to 0, such that n+m≥1 and n+m≤20,
each A block is composed of a polybutadiene,
each B block is composed of a diene elastomer, the molar content of units resulting from conjugated dienes of which is greater than 15%, the B blocks being identical to one another,
X is an organic or inorganic group which can comprise a functional group which interacts with a reinforcing filler,
the number-average molecular weight Mn1 of each A block varies from 2 500 to 20 000 g/mol,
the number-average molecular weight Mn2 of each B block varies from 80 000 to 350 000 g/mol, and
the content of 1,2- linkages in each A block is between 1 and 20%, makes possible a reduction in the hysteresis of a rubber composition in which it is present while retaining a processing acceptable for use in tires.

A subject-matter of the invention is thus a block diene elastomer corresponding to the following formula:

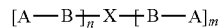

$$[A-B\text{\textemdash}_n X \text{\textemdash} B-A]_m$$

where:
n and m are each an integer of greater than or equal to 0, such that n+m≥1 and n+m≤20,
each A block is composed of a polybutadiene,
each B block is composed of a diene elastomer, the molar content of units resulting from conjugated dienes of which is greater than 15%, the B blocks being identical to one another,
X is an organic or inorganic group which can comprise a functional group which interacts with a reinforcing filler,
the number-average molecular weight Mn1 of each A block varies from 2 500 to 20 000 g/mol,
the number-average molecular weight Mn2 of each B block varies from 80 000 to 350 000 g/mol, and
the content of 1,2- linkages in the A block is between 1 and 20%.

DETAILED DESCRIPTION OF SPECIFIC EMBODIMENTS

Preferably, the ratio of the molecular weights Mn1/Mn2 is between 5 and 20%.

Preferably, m+n varies from 1 to 4. In other words, the block diene elastomer according to the invention preferably comprises from 1 to 4 A-B elastomer chains or branches (m, n and A-B being defined as above).

"Essentially unsaturated" diene elastomer (i.e., the molar content of units resulting from conjugated dienes of which is greater than 15%) capable of being employed in order to obtain the B block or blocks other than the polybutadiene block or blocks, themselves corresponding to this definition, is understood to mean any homopolymer obtained by polymerization of a conjugated diene monomer having from 4 to 12 carbon atoms, or any block, random, sequential or microsequential copolymer obtained by copolymerization of one or more conjugated dienes with one another or with one or more vinylaromatic compounds having from 8 to 20 carbon atoms.

The following are suitable in particular as conjugated dienes: 1,3-butadiene, 2-methyl-1,3-butadiene, 2,3-di($C_1$-$C_5$ alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, an aryl-1,3-butadiene, 1,3-pentadiene or 2,4-hexadiene. The following, for example, are suitable as vinylaromatic compounds: styrene, ortho-, meta- or para-methylstyrene, the "vinyltoluene" commercial mixture, para-(tert-butyl)styrene, methoxystyrenes, chlorostyrenes, vinylmesitylene, divinylbenzene or vinylnaphthalene.

Preferably, the B block or blocks are chosen from copolymers of styrene and butadiene, copolymers of styrene and isoprene, copolymers of butadiene and isoprene, styrene/butadiene/isoprene terpolymers and polyisoprene.

The following are suitable: polyisoprenes, butadiene/styrene copolymers and in particular those having a Tg (glass transition temperature Tg, measured according to ASTM D3418) of between 0° C. and −70° C. and more particularly between −10° C. and −60° C., a styrene content of between 5% and 60% by weight and more particularly between 20% and 50%, a content (mol %) of 1,2- bonds of the butadiene part of between 4% and 75% and a content (mol %) of trans-1,4- bonds of between 10% and 80%, butadiene/isoprene copolymers, in particular those having an isoprene content of between 5% and 90% by weight and a Tg of −40° C. to −80° C., or isoprene/styrene copolymers, in particular those having a styrene content of between 5% and 50% by weight and a Tg of between 5° C. and −55° C.

In the case of butadiene/styrene/isoprene copolymers, those having a styrene content of between 5% and 50% by weight and more particularly of between 10% and 40%, an isoprene content of between 15% and 60% by weight and more particularly between 20% and 50%, a butadiene content of between 5% and 50% by weight and more particularly of between 20% and 40%, a content (mol %) of 1,2- units of the butadiene part of between 4% and 85%, a content (mol %) of trans-1,4- units of the butadiene part of between 6% and 80%, a content (mol %) of 1,2- plus 3,4- units of the isoprene part of between 5% and 70% and a content (mol %) of trans-1,4- units of the isoprene part of between 10% and 50%, and more generally any butadiene/styrene/isoprene copolymer having a Tg of between −5° C. and −70° C., are suitable in particular.

According to a first embodiment of the invention, the B block or blocks are copolymers of styrene and butadiene.

According to a second embodiment of the invention, the B block or blocks are copolymers of styrene and isoprene.

Preferably, the X group comprises a functional group which interacts with a reinforcing filler.

Preferably, the functional group which interacts with the reinforcing filler comprises a group chosen from the following groups: silanol, mono-, di- or trialkoxysilane or alkoxysilane bearing a primary, secondary or tertiary amine functional group. Alternatively, the functional group which interacts with the reinforcing filler comprises a C—Sn bond.

The interactive functional group comprising a C—Sn bond can be obtained with a monohalotin functionalization agent or a dihalotin coupling agent which can correspond to the general formula $R_{4-x}SnX^0_x$, where x represents an integer having the value 1 or 2, R represents an alkyl, cycloalkyl, aryl, alkaryl or vinyl radical having from 1 to 12 carbon atoms, preferably a butyl, and $X^0$ is a halogen atom, preferably chlorine. Mention may be made, as preferred functionalization agent, of tributyltin monochloride or dibutyltin dichloride. In the same way, the functionalization can be obtained with a tin-derived functionalization agent which can correspond to the general formula $(X^1_y R^1_{3-y} Sn)$—O—$(SnR^1_{3-z}X^1_z)$ or $(X^1_y R^1_{3-y} Sn)$—O—$(CH_2)_e$—O—$(SnR^1_{3-z}X^1_z)$, where y and z represent integers varying from 0 to 2 and y+z is equal to 1 or 2, $R^1$ represents an alkyl, cycloalkyl, aryl, alkaryl or vinyl radical having from 1 to 12 carbon atoms, preferably a butyl, $X^1$ is a halogen atom, preferably chlorine, and e represents an integer from 1 to 20, preferably 4.

This interactive functional group can also be obtained with a tri- or tetrahalotin star-branching agent which can correspond to the formula $R^2_q SnX^2_{4-q}$, where q represents an integer having the value 0 or 1, $R^2$ represents an alkyl, cycloalkyl, aryl, alkaryl or vinyl radical having from 1 to 12 carbon atoms, preferably a butyl, and $X^2$ is a halogen atom, preferably chlorine. Mention may be made, as preferred star-branching agent, of butyltin trichloride or tin tetrachloride. In the same way, the star-branching can be obtained with a tin-derived functionalization agent which can correspond to the general formula $(X^3_k R^3_{3-k} Sn)$—O—$(SnR^3_{3-l}X^3_l)$ or $(X^3_k R^3_{3-k} Sn)$—O—$(CH_2)_f$—O—$(SnR^3_{3-l}X^3_l)$, where k and l represent integers varying from 0 to 3, k+l varying from 3 to 6, $R^3$ represents an alkyl, cycloalkyl, aryl, alkaryl or vinyl radical having from 1 to 12 carbon atoms, preferably a butyl, $X^3$ is a halogen atom, preferably chlorine, and f represents an integer having a value from 1 to 20, preferably 4.

The said interactive functional group can also comprise an amine group, which can be obtained, for example, with a functionalization agent, such as 4,4'-bis(diethylamino)benzophenone, also known as DEAB.

Thus, a preferred block diene elastomer according to the invention is such that the B block or blocks are copolymers of styrene and butadiene and X is an organic or inorganic group comprising a functional group which interacts with silica or carbon black, and n+m varies from 1 to 4.

More preferably still, the B block or blocks are copolymers of styrene and butadiene and X is interactive with carbon black and it can, for example, comprise a C—Sn bond, it being possible for the Sn functionalization to be obtained with a functionalization, coupling or star-branching agent as defined above, and n+m varies from 1 to 4.

The elastomer according to the invention is generally synthesized by anionic polymerization initiated by an initiator. Use may be made, as polymerization initiator, of any known monofunctional anionic initiator. Mention may in particular be made of organolithium initiators, in particular those comprising a carbon-lithium bond. Representative compounds are aliphatic organolithium compounds, such as ethyllithium, n-butyllithium (n-BuLi), isobutyllithium and dilithium polymethylenes, such as 1,4-dilithiobutane.

The polymerization is, as known per se, preferably carried out in the presence of an inert solvent which can, for example, be an aliphatic or alicyclic hydrocarbon, such as pentane, hexane, heptane, isooctane or cyclohexane, or an aromatic hydrocarbon, such as benzene, toluene or xylene.

The polymerization can be carried out continuously or batchwise. The polymerization is generally carried out at a temperature of between 20° C. and 120° C. and preferably in the vicinity of 30° C. to 90° C. It is, of course, also possible to add, at the end of polymerization, a transmetallation agent for mollifying the reactivity of the living chain end.

When the block diene elastomer according to the invention comprises a functional group which interacts with a reinforcing filler, the functionalized elastomer can be obtained in a way known per se by reaction of a functionalization or coupling or star-branching agent with the living diene elastomer resulting from the polymerization.

A further subject-matter of the invention is a crosslinkable or crosslinked rubber composition comprising an elastomer matrix, the elastomer matrix comprising a block diene elastomer according to the invention.

The composition can comprise from 1 to 100 phr of block diene elastomer according to the invention.

The composition according to the invention can also comprise at least one diene elastomer other than the said block elastomer according to the invention. This or these diene elastomers other than the block elastomer according to the invention can be chosen from the diene elastomers conventionally used in tires, such as natural rubber or a synthetic elastomer, or also another functionalized or star-branched elastomer.

The composition according to the invention can comprise a reinforcing filler.

Use may also be made of any type of reinforcing filler known for its abilities to reinforce a rubber composition which can be used for the manufacture of tires, for example a reinforcing organic filler, such as carbon black, a reinforcing inorganic filler, such as silica, or also a blend of these two types of filler, in particular a blend of carbon black and silica.

All carbon blacks, in particular blacks of the HAF, ISAF or SAF type, conventionally used in tires ("tire-grade" blacks), are suitable as carbon blacks. Mention will more particularly be made, among the latter, of the reinforcing carbon blacks of the 100, 200 or 300 series (ASTM grades), such as, for example, the N115, N134, N234, N326, N330, N339, N347 or N375 blacks.

Use may also be made, according to the applications targeted, of blacks of higher series FF, FEF, GPF or SRF, for example the N660, N683 or N772 blacks. The carbon blacks might, for example, be already incorporated in the isoprene elastomer in the form of a masterbatch (see, for example, Applications WO 97/36724 or WO 99/16600).

Mention may be made, as examples of organic fillers other than carbon blacks, of functionalized polyvinylaromatic organic fillers, such as described in Applications WO-A-2006/069792 and WO-A-2006/069793.

The term "reinforcing inorganic filler" should be understood, in the present patent application, by definition, as meaning any inorganic or mineral filler, whatever its colour and its origin (natural or synthetic), also known as "white filler", "clear filler" or indeed even "non-black filler", in contrast to carbon black, capable of reinforcing by itself alone, without means other than an intermediate coupling agent, a rubber composition intended for the manufacture of tires, in other words capable of replacing, in its reinforcing role, a conventional tire-grade carbon black; such a filler is generally characterized, in a known way, by the presence of hydroxyl (—OH) groups at its surface.

The physical state under which the reinforcing inorganic filler is provided is not important, whether it is in the form of a powder, of microbeads, of granules, of beads or any other appropriate densified form. Of course, the term "reinforcing inorganic filler" is also understood to mean mixtures of different reinforcing inorganic fillers, in particular of highly dispersible siliceous and/or aluminous fillers as described below.

Mineral fillers of the siliceous type, in particular silica ($SiO_2$), or of the aluminous type, in particular alumina ($Al_2O_3$), are suitable in particular as reinforcing inorganic fillers. The silica used can be any reinforcing silica known to a person skilled in the art, in particular any precipitated or fumed silica exhibiting a BET specific surface and a CTAB specific surface both of less than 450 $m^2/g$, preferably from to 400 $m^2/g$. Mention will be made, as highly dispersible precipitated silicas ("HDSs"), for example, of the Ultrasil 7000 and Ultrasil 7005 silicas from Degussa, the Zeosil 1165 MP, 1135 MP and 1115 MP silicas from Rhodia, the Hi-Sil EZ150G silica from PPG, the Zeopol 8715, 8745 and 8755 silicas from Huber or the silicas with a high specific surface as described in Application WO 03/16837.

When the composition according to the invention is intended for tire treads having a low rolling resistance, the reinforcing inorganic filler used, in particular if it is silica, preferably has a BET specific surface of between 45 and 400 $m^2/g$, more preferably of between 60 and 300 $m^2/g$.

Preferably, the content of reinforcing filler in the composition is between 30 and 150 phr, more preferably between 50 and 120 phr. The optimum is different according to the specific applications targeted: the expected level of reinforcement with regard to a bicycle tire, for example, is, of course, lower than that required with regard to a tire capable of running at high speed in a sustained manner, for example a motorcycle tire, a tire for a passenger vehicle or a tire for a utility vehicle, such as a heavy-duty vehicle.

According to one embodiment, the reinforcing filler predominantly comprises silica, the content of carbon black present in the composition preferably being between 2 and 20 phr.

According to another embodiment of the invention, the reinforcing filler predominantly comprises carbon black.

Use is made, in a known manner, in order to couple the reinforcing inorganic filler to the diene elastomer, of an at least bifunctional coupling agent (or bonding agent) intended to provide a satisfactory connection, of chemical and/or physical nature, between the inorganic filler (surface of its particles) and the diene elastomer, in particular bifunctional organosilanes or polyorganosiloxanes.

Use is made in particular of silane polysulphides, referred to as "symmetrical" or "unsymmetrical" depending on their specific structure, such as described, for example, in Applications WO 03/002648 (or US 2005/016651) and WO 03/002649 (or US 2005/016650).

Suitable in particular, without the definition below being limiting, are silane polysulphides known as "symmetrical", corresponding to the following general formula (III):

$$Z\text{-}A\text{-}S_x\text{-}A\text{-}Z, \text{ in which:} \quad (III)$$

x is an integer from 2 to 8 (preferably from 2 to 5);

A is a divalent hydrocarbon radical (preferably $C_1$-$C_{18}$ alkylene groups or $C_6$-$C_{12}$ arylene groups, more particularly $C_1$-$C_{10}$, in particular $C_1$-$C_4$, alkylenes, in particular propylene);

Z corresponds to one of the formulae below:

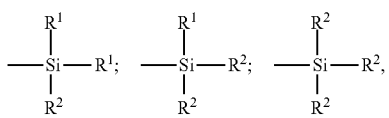

in which:
- the $R^1$ radicals, which are substituted or unsubstituted and identical to or different from one another, represent a $C_1$-$C_{18}$ alkyl group, a $C_5$-$C_{18}$ cycloalkyl group or a $C_6$-$C_{18}$ aryl group (preferably $C_1$-$C_6$ alkyl, cyclohexyl or phenyl groups, in particular $C_1$-$C_4$ alkyl groups, more particularly methyl and/or ethyl);
- the $R^2$ radicals, which are substituted or unsubstituted and identical to or different from one another, represent a $C_1$-$C_{18}$ alkoxyl group or a $C_5$-$C_{18}$ cycloalkoxyl group (preferably a group chosen from $C_1$-$C_8$ alkoxyls and $C_5$-$C_8$ cycloalkoxyls, more preferably still a group chosen from $C_1$-$C_4$ alkoxyls, in particular methoxyl and ethoxyl).

In the case of a mixture of alkoxysilane polysulphides corresponding to the above formula (III), in particular normal commercially available mixtures, the mean value of the "x" indices is a fractional number preferably of between 2 and 5, more preferably of approximately 4. However, the invention can also advantageously be carried out, for example, with alkoxysilane disulphides (x=2).

Mention will more particularly be made, as examples of silane polysulphides, of bis(($C_1$-$C_4$)alkoxyl($C_1$-$C_4$)alkylsilyl ($C_1$-$C_4$)alkyl)polysulphides (in particular disulphides, trisulphides or tetrasulphides), such as, for example, bis(3-trimethoxysilylpropyl) or bis(3-triethoxysilylpropyl) polysulphides. Use is in particular made, among these compounds, of bis(3-triethoxysilylpropyl)tetrasulphide, abbreviated to TESPT, of formula $[(C_2H_5O)_3Si(CH_2)_3S_2]_2$, or bis(triethoxysilylpropyl)disulphide, abbreviated to TESPD, of formula $[(C_2H_5O)_3Si(CH_2)_3S]_2$. Mention will also be made, as preferred examples, of bis(mono($C_1$-$C_4$) alkoxyldi($C_1$-$C_4$)alkylsilylpropyl)polysulphides (in particular disulphides, trisulphides or tetrasulphides), more particularly bis(monoethoxydimethylsilylpropyl)tetrasulphide, such as described in Patent Application WO 02/083782 (or US 2004/132880).

Mention will in particular be made, as coupling agent other than an alkoxysilane polysulphide, of bifunctional POSs (polyorganosiloxanes) or else of hydroxysilane polysulphides ($R^2$=OH in the above formula III), such as described in Patent Applications WO 02/30939 (or U.S. Pat. No. 6,774, 255) and WO 02/31041 (or US 2004/051210), or else of silanes or POSs carrying azodicarbonyl functional groups, such as described, for example, in Patent Applications WO 2006/125532, WO 2006/125533, WO 2006/125534 and WO 2009/062733.

In the rubber composition, the content of coupling agent is preferably between 4 and 12 phr, more preferably between 3 and 8 phr.

A person skilled in the art will understand that a reinforcing filler of another nature, in particular organic nature, might be used as filler equivalent to the reinforcing inorganic filler described in the present section, provided that this reinforcing filler is covered with an inorganic layer, such as silica, or else comprises, at its surface, functional sites, in particular hydroxyls, requiring the use of a coupling agent in order to form the connection between the filler and the elastomer.

The composition according to the invention can also comprise a chemical crosslinking agent.

The chemical crosslinking makes possible the formation of covalent bonds between the elastomer chains. The chemical crosslinking can be carried out using a vulcanization system or else using peroxide compounds.

The vulcanization system proper is based on sulphur (or on a sulphur-donating agent) and on a primary vulcanization accelerator. Additional to this base vulcanization system are various known secondary vulcanization accelerators or vulcanization activators, such as zinc oxide, stearic acid or equivalent compounds, or guanidine derivatives (in particular diphenylguanidine), incorporated during the first non-productive phase and/or during the productive phase, as described subsequently.

The sulphur is used at a preferred content of between 0.5 and 12 phr, in particular between 1 and 10 phr. The primary vulcanization accelerator is used at a preferred content of between 0.5 and 10 phr, more preferably of between 0.5 and 5.0 phr.

Use may be made, as (primary or secondary) accelerator, of any compound capable of acting as accelerator for the vulcanization of diene elastomers in the presence of sulphur, in particular accelerators of the thiazole type, and also their derivatives, and accelerators of thiuram and zinc dithiocarbamate types. These accelerators are, for example, selected from the group consisting of 2-mercaptobenzothiazyl disulphide (abbreviated to "MBTS"), tetrabenzylthiuram disulphide ("TBZTD"), N-cyclohexyl-2-benzothiazolesulphenamide ("CBS"), N,N-dicyclohexyl-2-benzothiazolesulphenamide ("DCBS"), N-(tert-butyl)-2-benzothiazolesulphenamide ("TBBS"), N-(tert-butyl)-2-benzothiazolesulphenimide ("TBSI"), zinc dibenzyldithiocarbamate ("ZBEC") and the mixtures of these compounds.

Preferably, use is made of a primary accelerator of the sulphenamide type.

When the chemical crosslinking is carried out using one or more peroxide compounds, the said peroxide compound or compounds represent from 0.01 to 10 phr.

Mention may be made, as peroxide compounds which can be used as chemical crosslinking system, of acyl peroxides, for example benzoyl peroxide or p-chlorobenzoyl peroxide, ketone peroxides, for example methyl ethyl ketone peroxide, peroxyesters, for example t-butyl peroxyacetate, t-butyl peroxybenzoate and t-butyl peroxyphthalate, alkyl peroxides, for example dicumyl peroxide, di(t-butyl) peroxybenzoate and 1,3-bis(t-butylperoxyisopropyl)benzene, or hydroperoxides, for example t-butyl hydroperoxide.

The rubber composition according to the invention can also comprise all or a portion of the usual additives generally used in elastomer compositions intended for the manufacture of tires, in particular of treads, such as, for example, plasticizers or extending oils, whether the latter are of aromatic or non-aromatic nature, pigments, protection agents, such as antiozone waxes (such as Cire Ozone C32 ST), chemical antiozonants or antioxidants (such as 6-PPD), antifatigue agents, reinforcing resins, methylene acceptors (for example, phenolic novolak resin) or methylene donors (for example, HMT or H3M), as described, for example, in Application WO 02/10269, or adhesion promoters (cobalt salts, for example).

Preferably, the composition according to the invention comprises, as preferred non-aromatic or very weakly aromatic plasticizing agent, at least one compound chosen from the group consisting of naphthenic oils, paraffinic oils, MES oils, TDAE oils, glycerol esters (in particular trioleates), plasticizing hydrocarbon resins exhibiting a high Tg preferably of greater than 30° C., and mixtures of such compounds.

The composition according to the invention can also comprise, in addition to the coupling agents, activators of the coupling of the reinforcing inorganic filler or more generally processing aids capable, in a known way, by virtue of an improvement in the dispersion of the inorganic filler in the rubber matrix and of a lowering in the viscosity of the compositions, of improving their ease of processing in the raw state, these processing aids being, for example, hydrolysable silanes, such as alkylalkoxysilanes (in particular alkyltriethoxysilanes), polyols, polyethers (for example, polyethylene glycols), primary, secondary or tertiary amines (for example, trialkanolamines), hydroxylated or hydrolysable POSs, for example $\alpha,\omega$-dihydroxypolyorganosiloxanes (in particular $\alpha,\omega$-dihydroxypolydimethylsiloxanes), or fatty acids, such as, for example, stearic acid.

The rubber composition according to the invention is manufactured in appropriate mixers, using two successive phases of preparation according to a general procedure well known to those skilled in the art: a first phase of thermomechanical working or kneading (sometimes referred to as "non-productive" phase) at high temperature, up to a maximum temperature of between 130° C. and 200° C., preferably between 145° C. and 185° C., followed by a second phase of mechanical working (sometimes referred to as "productive" phase) at lower temperature, typically below 120° C., for example between 60° C. and 100° C., during which finishing phase the chemical crosslinking agent is incorporated.

According to a preferred embodiment of the invention, all the base constituents of the composition according to the invention, with the exception of the chemical crosslinking agent, namely in particular the reinforcing filler or fillers and the coupling agent, if appropriate, are intimately incorporated, by kneading, in the block diene elastomer according to the invention and in the other diene elastomers, if appropriate, during the first "non-productive" phase, that is to say that at least these various base constituents are introduced into the mixer and are thermomechanically kneaded, in one or more stages, until the maximum temperature of between 130° C. and 200° C., preferably of between 145° C. and 185° C., is reached.

By way of example, the first (non-productive) phase is carried out in a single thermomechanical stage during which all the necessary constituents, the optional supplementary processing aids and various other additives, with the exception of the chemical cros slinking agent, are introduced into an appropriate mixer, such as an ordinary internal mixer. The total duration of the kneading, in this non-productive phase, is preferably between 1 and 15 min. After cooling the mixture thus obtained during the first non-productive phase, the chemical crosslinking agent is then incorporated at low temperature, generally in an external mixer, such as an open mill; everything is then mixed (productive phase) for a few minutes, for example between 2 and 15 min.

The final composition thus obtained is subsequently calendered, for example in the form of a sheet or plaque, in particular for laboratory characterization, or else extruded in the form of a rubber profiled element which can be used, for example, as a tire tread for a passenger vehicle.

A further subject-matter of the invention is a semi-finished article made of rubber for a tire, comprising the crosslinked or crosslinkable rubber composition according to the invention. Preferably, the said article is a tread.

A final subject-matter of the invention is a tire comprising a semi-finished article according to the invention.

The invention is illustrated by the following examples.

EXAMPLES

1—Preparation of an Elastomer Matrix According to the Invention

1.1—Measurements and Tests Used—Experimental Techniques Used for the Pre-Curing Characterization of the Polymers Obtained (a) Determination of the molar mass distribution by the size exclusion chromatography (conventional SEC) technique Size exclusion chromatography or SEC makes it possible to separate macromolecules in solution according to their size through columns filled with a porous gel. The macromolecules are separated according to their hydrodynamic volume, the bulkiest being eluted first.

Without being an absolute method, SEC makes it possible to comprehend the distribution of the molar masses of a polymer. The various number-average molar masses (Mn) and weight-average molar masses (Mw) and the (Wp) weight at the peak can be determined from commercial standard products and the polydispersity index (PI=Mw/Mn) can be calculated via a "Moore" calibration.

(1) Preparation of the Polymer:

There is no specific treatment of the polymer sample before analysis. The latter is simply dissolved in tetrahydrofuran at a concentration of approximately 1 g/l. The solution is then filtered through a filter with a porosity of 0.45 µm before injection.

(2) SEC Analysis:

The apparatus used is a "Waters Alliance" chromatograph. The elution solvent is tetrahydrofuran, the flow rate is 0.7 ml/min, the temperature of the system is 35° C. and the analytical time is 90 min. A set of four Waters columns in series, with commercial names "Styragel HMW7", "Styragel HMW6E" and two "Styragel HT6E", is used.

The volume of the solution of the polymer sample injected is 100 µl. The detector is a "Waters 2410" differential refractometer and the software for making use of the chromatographic data is the "Waters Empower" system.

The calculated average molar masses relate to a calibration curve produced with polystyrene standards having known molar masses.

(b) For the polymers and rubber compositions, the Mooney viscosities ML (1+4) at 100° C. are measured according to Standard ASTM D-1646.

Use is made of an oscillating consistometer as described in Standard ASTM D-1646. The Mooney plasticity measurement is carried out according to the following principle: the composition in the raw state (i.e., before curing) is moulded in a cylindrical chamber heated to 100° C. After preheating for one minute, the rotor rotates within the test specimen at 2 revolutions/minute and the working torque for maintaining this movement is measured after rotating for 4 minutes. The Mooney plasticity (ML 1+4) is expressed in "Mooney unit" (MU, with 1 MU=0.83 N.m).

(c) The glass transition temperatures Tg of the polymers are measured according to Standard ASTM D3418-03 using a differential scanning calorimeter.

(d) Near-infrared spectroscopy (NIR) is used to quantitatively determine the content by weight of styrene in the elastomer and its microstructure (relative distribution of the 1,2-vinyl, trans-1,4 and cis-1,4 butadiene units). The principle of the method is based on the Beer-Lambert law generalized for a multicomponent system. As the method is indirect, it involves a multivariate calibration [Vilmin, F., Dussap, C. and Coste, N., Applied Spectroscopy, 2006, 60, 619-29] carried out using standard elastomers having a composition determined by $^{13}$C NMR. The styrene content and the microstructure are then calculated from the NIR spectrum of an elastomer film having a thickness of approximately 730 µm. The spectrum is acquired in transmission mode between 4000 and 6200 cm$^{-1}$ with a resolution of 2 cm$^{-1}$ using a Bruker Tensor 37 Fourier-transform near-infrared spectrometer equipped with an InGaAs detector cooled by the Peltier effect.

(e) For the polymers, the intrinsic viscosity at 25° C. of a 0.1 g/dl solution of polymer in toluene is measured starting from a solution of dry polymer:

The intrinsic viscosity is determined by the measurement of the flow time t of the polymer solution and of the flow time $t_o$ of the toluene in a capillary tube.

The flow time of the toluene and the flow time of the 0.1 g/dl polymer solution are measured in an Ubbelohde tube (diameter of the capillary 0.46 mm, capacity from 18 to 22 ml) placed in a bath thermostatically controlled at 25±0.1° C.

The intrinsic viscosity is obtained by the following relationship:

$$\eta_{inh} = \frac{1}{C} \ln\left[\frac{(t)}{(t_O)}\right]$$

with:
C: concentration of the toluene solution of polymer in g/dl;
t: flow time of the toluene solution of polymer in seconds;
$t_o$: flow time of the toluene in seconds;
$\eta_{inh}$: intrinsic viscosity, expressed in dl/g.

1.2—Preparation of an Elastomer A: Control Functionalized Copolymer (Denoted SBR A)

(a) Copolymerization of Butadiene and Styrene:

The control copolymer batchwise in a reactor with a reaction volume of 75 l, under nitrogen pressure, which reactor is equipped with a stirrer of turbine type. Cyclohexane, butadiene and styrene are introduced into this reactor according to respective proportions by weight of 100/10/6.6. 500 parts per million (by weight) of tetrahydrofuran (THF), as agent promoting vinyl bonds, are also added to this reactor.

An amount of 45 µmol of active n-butyllithium (n-BuLi) per 100 g of solution is introduced into the reactor in order to neutralize the protic impurities which are contributed by the various constituents present in the reactor.

650 µmol of n-BuLi, representing the amount of active initiator in order to initiate the polymerization, are introduced.

The temperature of the reactor is maintained at 50° C. and, after a polymerization time of 60 min, the conversion of monomers is 74%.

312 µmol/100 g of monomers of a functionalization agent consisting of dibutyldichlorotin are subsequently added to the same reactor. The functionalization reaction is carried out at 50° C. After 15 min of this coupling reaction, the copolymer thus functionalized is subjected to an anti-oxidizing treatment using 0.8 phr of 2,2'-methylenebis(4-methyl-6-(tert-butyl) phenol) and 0.2 phr of N-(1,3-dimethylbutyl)-N'-phenyl-p-phenylenediamine. Any reaction is stopped by the addition of 1.5 lithium equivalents of methanol.

The copolymer thus treated is separated from its solution by a steam stripping operation and is then dried on a screw machine at 150° C. for 15 sec, in order to obtain the control functionalized copolymer A.

The intrinsic viscosity of this copolymer A is 1.94 dl/g and its ML viscosity is 83.

This copolymer A comprises 28% of styrene (by weight) and, for its butadiene part, 2.8% of vinyl units and the glass transition temperature Tg of this copolymer A is −47.7° C.

The number-average molecular weight and the polydispersity index of this copolymer A, which are determined by conventional SEC, are 183 732 g/mol and 1.18 respectively.

1.3—Preparation of a B Elastomer (Denoted SBR B): Functionalized Copolymer Comprising Three Blocks According to the Invention (a) Preparation of a Living Polybutadiene:

The living polybutadiene is prepared batchwise in a bottle with a capacity of 750 ml. On the one hand, 320 ml of methylcyclohexane and 80 ml of butadiene according to the respective ratios by weight of 100/20 and, on the other hand, an amount of 10 000 µmol of active sec-butyllithium (s-BuLi) per 100 g of butadiene are introduced into this bottle.

The polymerization is carried out at 70° C. and, after a reaction time of 12 min, the butadiene conversion is 100%. This living polybutadiene thus obtained is stored in a freezer in order to be used at a later date.

A second bottle is prepared in parallel by the same procedure and stopped by one lithium equivalent of methanol in order to characterize the polybutadiene thus obtained. The number-average molecular weight, which is determined by conventional SEC, is 109 437 g/mol. The content of 1,2-linkages is 10%.

(b) Copolymerization of Butadiene and Styrene Initiated by This Living Polybutadiene:

The block copolymer other than the said living polybutadiene is prepared batchwise in a reactor with a capacity of 10 l, under nitrogen pressure, which reactor is equipped with a stirrer of turbine type. 6200 ml of methylcyclohexane, 689 ml of butadiene and 387 ml of styrene are introduced into this reactor according to respective proportions by weight of 100/9.2/7.3. 550 parts per million (by weight) of tetrahydrofuran (THF), as agent promoting vinyl bonds, are also added to this reactor.

An amount of 1500 µmol of active n-butyllithium (n-BuLi) is introduced into the reactor in order to neutralize the protic impurities which are contributed by the various constituents present in the reactor with the aim of limiting the formation of dead or deactivated polybutadiene during the introduction of the living polybutadiene solution into the reactor.

All of the living polybutadiene prepared in the preceding stage described in section (a) of chapter 1-2), representing the amount of active initiator for initiating the polymerization, is introduced.

The temperature of the reactor is maintained at 50° C. and, after a polymerization time of 55 min, the conversion of monomers is 70%.

The intrinsic viscosity of the copolymer before functionalization, measured on a withdrawn sample stopped by one lithium equivalent of methanol, is 1.35 dl/g and the number-average molecular weight and the polydispersity index of the same withdrawn sample, which are determined by conventional SEC, are 109 437 g/mol and 1.15 respectively.

2496 µmol/100 g of monomers of a functionalization agent consisting of dibutyldichlorotin are subsequently added to the same reactor. The functionalization reaction is carried out at 60° C. After 30 min of this coupling reaction, the block copolymer thus functionalized is subjected to an anti-oxidizing treatment using 0.8 phr of 2,2'-methylenebis(4-methyl-6-(tert-butyl)phenol) and 0.2 phr of N-(1,3-dimethylbutyl)-N'-phenyl-p-phenylenediamine. Any reaction is stopped by the addition of 1.5 lithium equivalents of methanol.

The copolymer thus treated is separated from its solution by a steam stripping operation, is then superficially dried on an open mill at 100° C. for approximately 5 min and is dried in an oven at 60° C. under vacuum and under a stream of nitrogen for approximately 4 hours, in order to obtain the functionalized block copolymer B according to the invention.

The intrinsic viscosity of this copolymer B is 2.09 dl/g and its ML viscosity is 87.

The SBR block of this copolymer B comprises 28.6% of styrene (by weight) and, for its butadiene part, 22.1% of vinyl units and the glass transition temperature Tg of this copolymer B is −49° C.

The number-average molecular weight and the polydispersity index of this copolymer B, which are determined by conventional SEC, are 175 489 g/mol and 1.28 respectively.

2—Comparative Examples of Rubber Compositions 2.1—Measurements and Tests Used a) The Mooney viscosity ML (large rotor) or MS (small rotor) (1+4) at 100° C.: measured according to Standard ASTM: D-1646, entitled "Mooney" in the tables.

(b) The Shore A hardness: measurements carried out according to Standard DIN 53505.

(c) The tensile tests make it possible to determine the elasticity stresses and the properties at break.

Unless otherwise indicated, they are carried out in accordance with French Standard NF T 46-002 of September 1988. Processing the tensile recordings also makes it possible to plot the curve of modulus as a function of the elongation, the modulus used here being the nominal (or apparent) secant modulus measured in first elongation, calculated by reducing to the initial cross-section of the test specimen. The nominal secant moduli (or apparent stresses, in MPa) are measured in first elongation, at 60° C.±2° C., at 10%, 100% and 300% elongation, respectively denoted MSA10, MSA100 and MSA300. The breaking stresses (BS) in MPa and the elongations at break (EB) in % are measured at 60° C.±2° C. according to Standard NF T 46-002.

(d) The dynamic properties ΔG* and tan(δ)max are measured on a viscosity analyser (Metravib VA4000) according to Standard ASTM D 5992-96. The response of a sample of vulcanized composition (cylindrical test specimen with a thickness of 2 mm and a cross-section of 79 mm²), subjected to a simple alternating sinusoidal shear stress, at a frequency of 10 Hz, under standard temperature conditions (23° C.) according to Standard ASTM D 1349-99 or, as the case may be, at a different temperature (60° C.), is recorded. A peak-to-peak strain amplitude sweep is carried out from 0.1% to 50% (outward cycle) and then from 50% to 0.1% (return cycle). The results made use of are the complex dynamic shear modulus (G*) and the loss factor tan δ. The maximum value of tan δ observed (tan(δ)max) and the difference in complex modulus (ΔG*) between the values at 0.1% and 50% strain (Payne effect) are shown for the return cycle.

2.2—Example

In this example, the two elastomers SBR A and SBR B were used for the preparation of rubber compositions A and B, each comprising carbon black as reinforcing filler.

Each of these compositions A and B exhibits the following formulation (expressed in phr: parts per hundred parts of elastomer):

| | |
|---|---|
| Elastomer | 100 |
| N234 | 54 |
| Paraffin | 1 |
| Antioxidant (1) | 4 |
| Stearic acid | 1.5 |
| ZnO | 3 |
| Sulphur | 1.3 |
| Accelerator (2) | 1.3 |

(1) N-(1,3-dimethylbutyl)-N-phenyl-para-phenylenediamine (6-PPD)
(2) N-cyclohexyl-2-benzothiazolesulphenamide (CBS)

Each of the following compositions is produced, in a first step, by thermomechanical working and then, in a second finishing step, by mechanical working.

The elastomer, the black, the paraffin, the antioxidant, the stearic acid and the zinc monoxide are successively introduced into a laboratory internal mixer of "Banbury" type which has a capacity of 400 cm³, which is 75% filled and which has an initial temperature of approximately 70° C. The stage of thermomechanical working is carried out for from 5 to 6 minutes, up to a maximum dropping temperature of approximately 160° C. The abovementioned first step of thermomechanical working is thus carried out, it being specified that the mean speed of the blades during this first step is 70 revolutions/min.

The mixture thus obtained is recovered and cooled and then, in an external mixer (homofinisher), the sulphur and the accelerator are added at 30° C., the combined mixture being further mixed for a time of 3 to 4 minutes (abovementioned second step of mechanical working).

The compositions thus obtained are subsequently calendered, either in the form of plaques (with a thickness ranging from 2 to 3 mm) or of thin sheets of rubber, for the measurement of their physical or mechanical properties. The vulcanization is carried out at 150° C. for 15 minutes.

The properties of these two compositions are compared with one another, both in the non-vulcanized state and in the vulcanized state. The results are given in the following table:

| | Composition | |
|---|---|---|
| | A | B |
| | Elastomer | |
| | SBR A | SBR B |
| ML (1 + 4) 100° C. (elastomer) | 83 | 87 |
| Properties in the non-vulcanized state: | | |
| MS(1 + 4) 100° C. (mixture) | 55 | 58 |
| Properties in the vulcanized state: | | |
| Shore A | 66 | 66 |
| MSA10 | 6.73 | 6.47 |
| MSA100 | 2.75 | 2.70 |
| MSA300 | 5.32 | 5.41 |

-continued

|  | Composition | |
|---|---|---|
|  | A | B |
|  | Elastomer | |
|  | SBR A | SBR B |
| MSA300/MSA100 | 1.93 | 2.00 |
| Losses 60° C. (%) | 26 | 23 |
| Tension: | | |
| BS (MPa) | 20 | 19 |
| EB (%) | 386 | 362 |
| Dynamic properties as a function of the strain: | | |
| ΔG* (MPa) at 60° C. | 1.45 | 1.27 |
| Tan$\delta_{max}$ at 60° C. | 0.170 | 0.155 |

It should be noted that the composition B according to the invention, based on the said functionalized block copolymer, exhibits a "mixture" Mooney value similar to that of the control composition A based on the functionalized SBR A. The composition B according to the invention and the control composition A thus exhibit an equivalent processability in the non-vulcanized state.

As regards the properties in the vulcanized state, the composition B according to the invention and the control composition A exhibit equivalent properties, except for the losses at 60° C. and the dynamic properties. This is because the composition B according to the invention exhibits values of losses at 60° C., of ΔG* and of Tan $\delta_{max}$ at 60° C. which are lower than those of the control composition A. The hysteresis properties of the composition B according to the invention are thus improved, with respect to those of the control composition A.

In other words, the composition B according to the invention, based on the said functionalized block copolymer B, exhibits improved rubber properties in the non-crosslinked state and in the crosslinked state, with respect to those of the composition A based on the functionalized SBR A, as a result of a markedly reduced hysteresis at equivalent processing.

The invention claimed is:

1. Block diene elastomer corresponding to the following formula:

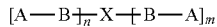

where:
n and m are each an integer of greater than or equal to 0, such that n+m≥1 and n+m≤20,
each A block is composed of a polybutadiene,
each B block is composed of a diene elastomer, the molar content of units resulting from conjugated dienes of which is greater than 15%, the B blocks being identical to one another,
X is an organic or inorganic group which can comprise a functional group which interacts with a reinforcing filler,
the number-average molecular weight Mn1 of each A block varies from 2 500 to 20 000 g/mol,
the number-average molecular weight Mn2 of each B block varies from 80 000 to 350 000 g/mol, and
the content of 1,2- linkages in each A block is between 1 and 20%.

2. Block diene elastomer according to claim 1, wherein the ratio of the said molecular weights Mn1/Mn2 is between 5 and 20%.

3. Block diene elastomer according to claim 1, wherein m+n varies from 1 to 4.

4. Block diene elastomer according to claim 1, wherein the said functional group which interacts with the reinforcing filler comprises a group chosen from the following groups: silanol, amine, mono-, di- or trialkoxysilane, alkoxysilane bearing a primary, secondary or tertiary amine functional group.

5. Block diene elastomer according to claim 1, wherein the said functional group which interacts with the reinforcing filler comprises a C—Sn bond.

6. Block diene elastomer according to claim 5, wherein the said functional group which interacts with the reinforcing filler is obtained by reaction with a mono-, di-, tri- or tetrahalotin agent.

7. Block diene elastomer according to claim 1, wherein the B block or blocks are chosen from polyisoprene, copolymers of styrene and butadiene, copolymers of styrene and isoprene, copolymers of butadiene and isoprene or styrene/butadiene/isoprene terpolymers.

8. Crosslinkable or crosslinked rubber composition comprising an elastomer matrix, wherein the elastomer matrix comprises a block diene elastomer as defined in claim 1.

9. Composition according to claim 8, wherein it comprises a reinforcing filler.

10. Composition according to claim 8, wherein the composition further comprises a chemical crosslinking agent.

11. Semi-finished article made of rubber for a tire, wherein it comprises a crosslinkable or crosslinked rubber composition as defined in claim 8.

12. Tire, wherein it comprises a semi-finished article as defined in claim 11.

* * * * *